(12) United States Patent
Mendiola et al.

(10) Patent No.: US 7,200,634 B2
(45) Date of Patent: Apr. 3, 2007

(54) INSTANT MESSAGING ACCOUNT SYSTEM

(75) Inventors: Dennis Mendiola, New York, NY (US);
Brian Schlotman, Cincinnati, OH (US)

(73) Assignee: Chikka Pte Ltd., Singapore (SG)

( * ) Notice: Subject to any disclaimer, the term of this patent is extended or adjusted under 35 U.S.C. 154(b) by 614 days.

(21) Appl. No.: 09/846,249

(22) Filed: May 2, 2001

(65) Prior Publication Data

US 2002/0007398 A1    Jan. 17, 2002

Related U.S. Application Data

(60) Provisional application No. 60/202,864, filed on May 10, 2000.

(30) Foreign Application Priority Data

May 10, 2000    (WO) ..................... PCT/SG00/00068

(51) Int. Cl.
*G06F 15/16*    (2006.01)
(52) U.S. Cl. .................................................... 709/204
(58) Field of Classification Search ........ 709/203–207, 709/217, 218
See application file for complete search history.

(56) References Cited

U.S. PATENT DOCUMENTS 6,272,530 B1 *   8/2001   Horiuchi et al. ............ 709/206

(Continued)

FOREIGN PATENT DOCUMENTS

EP    0 898 431 A1    2/1999

(Continued)

OTHER PUBLICATIONS

U.S. Appl. No. 09/846,376, Method And System For Tracking The Online Status Of Active Users Of An Internet-Based Instant Messaging System, filed May 2, 2001 (including Preliminary Amendment filed concurrently therewith).

(Continued)

*Primary Examiner*—Krisna Lim
*Assistant Examiner*—Yasin Barqadle
(74) *Attorney, Agent, or Firm*—Intellectual Property Law Group LLP; Otto O. Lee; Juneko C. Jackson

(57) ABSTRACT

An instant messaging system and a method of instant messaging between a plurality of clients having IM applications of the same or different types. The IM system includes a plurality of clients having IM client applications of the following types: a PC-based instant messaging client application program (101, 301); a GSM device (104, 303) forming part of a GSM network; an internet browser-based client application 201, 305; and an email-based client application (208, 307). An IM system host (141, 211, 316) including an IM server (143, 217, 311) is selectively connected to each of the clients via the direct electronic links or the internet (117, 213, 309) and provides a prescribed range of functionality to the clients. This functionality includes sending an IM, receiving an IM and identifying which members of a group of clients that a client is a member, or prospective member, of are online. Each client type has a unique identifier to enable access thereto via the internet (117, 213, 309) and each client has a single account on the IM host/server for all of its client types that can access the IM server (143, 217, 311). The account is identified by a unique identification number ("UIN") common to all of the client types of that client and each unique identifier of each client type of a client is matched to the UIN of the particular client.

9 Claims, 4 Drawing Sheets

U.S. PATENT DOCUMENTS

| | | | |
|---|---|---|---|
| 6,301,609 B1* | 10/2001 | Aravamudan et al. | 709/207 |
| 6,393,463 B1* | 5/2002 | Fuchigami | 709/206 |
| 6,487,538 B1* | 11/2002 | Gupta et al. | 705/14 |
| 6,539,077 B1* | 3/2003 | Ranalli et al. | 379/67.1 |
| 6,539,421 B1* | 3/2003 | Appelman et al. | 709/206 |
| 6,691,159 B1* | 2/2004 | Grewal et al. | 709/219 |
| 6,735,624 B1* | 5/2004 | Rubin et al. | 709/219 |
| 6,747,970 B1* | 6/2004 | Lamb et al. | 370/352 |
| 2001/0003202 A1 | 6/2001 | Mache et al. | |
| 2001/0003203 A1 | 6/2001 | Mache | |
| 2001/0034224 A1* | 10/2001 | McDowell et al. | 455/412 |

FOREIGN PATENT DOCUMENTS

| | | |
|---|---|---|
| WO | WO 99 48011 | 9/1999 |
| WO | WO 00 16209 | 3/2000 |

OTHER PUBLICATIONS

U.S. Appl. No. 09/846,377, Method And System For Inviting And Creating Accounts For Prospective Uses Of An Instant Messaging System, filed May 2, 2001 (including Preliminary Amendment filed concurrently therewith).

U.S. Appl. No. 09/928,433, Instant Messaging System And Method For Remote Networks Using a Sequential Message Handshaking Protocol, filed Aug. 14, 2001 (including Preliminary Amendment filed concurrently therewith).

* cited by examiner

INSTANT MESSAGING ACCOUNT SYSTEM

This application claims the benefit of priority from U.S. provisional application No. 60/202,864, filed May 10, 2000.

FIELD OF THE INVENTION

The present invention relates to a computer network based instant messaging system and a method for managing a plurality of different clients or appliances. These different clients or appliances include, but are not limited to, a Global System for Mobile Communications ("GSM") mobile phone, a personal computer-based client application, an internet browser-based client, and an email client application.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Instant messaging ("IM") systems have become very popular in recent times with the increasing use of the internet and email by all sectors of the community as a communication medium. With internet use pervading the areas of the domestic market and being taken up by younger, computer-literate generations as a social medium in its own right, a need has arisen for spontaneous and "instantaneous" messages to be exchanged between two or more parties connected to the internet simultaneously. This need has not been able to able to be satisfied by the use of traditional email systems and consequently, IM systems have spawned as an alternative or adjunct to email.

"Instantaneous" in the context of IM means the ability to receive messages without prompting a message-handling server. This is in contrast to the way typical emails are sent and received by internet users.

To send and receive messages using popular personal computer-based email applications, such as Eudora™ or Microsoft Outlook™, employ the Simple Mail Transfer Protocol ("SMTP") and the Post Office Protocol ("POP"). Using POP requires the recipient of an email to query or prompt an email server to which it has subscribed, for messages to download to the user's personal computer ("PC") or any other internet-connected device.

Email messages are sent by a user from an email PC client application (e.g., Eudora™, Microsoft Outlook™) on that user's PC to a mail server to which it has subscribed using SMTP. The mail or SMTP server then forwards the message to the desired recipient's mail server via the internet.

Instant messaging systems work in a different fashion to email, requiring minimal if any user action, to receive messages. Messages are forwarded from a sender's client application, normally a PC-based IM client application program, to the intended recipient's client application via an IM server or directly to the recipient's client, almost in "real time" from the time that a message is sent by the sender, or received by the IM server system—hence "instant". No querying is needed to get a message to its intended recipient, reflecting more of a "pushing" technology, than a "pulling" of information. Examples of some popular IM systems in the market include AOL's AIM™ and ICQ™.

A characteristic of most IM systems is that a client user is able to set up a network of friends or colleagues, more commonly known as "buddies" with or amongst whom messages can be exchanged instantly. In most of the PC-based client applications, an IM sender must be authorized by the recipient (both are considered "buddies" of one another) to be able to receive messages from the sender. In such cases, an authorization is made by a user specifically instructing the IM server to allow messages to be received from particular senders.

In some IM systems, authorizations are not required for users to be included in a buddy list. This means that instant messages may be freely sent amongst existing users and a target user can be added to a particular buddy list of a user without that user requiring the explicit permission of the target user to be so included.

Authorizations may also be required by users to allow them to be detected by other users as being "online". "Online" in the context of IM means that a client user is connected to the internet or is otherwise capable of receiving instant messages at a particular moment. The capability of being able to determine who amongst a user's group of buddies is online is an important functionality of IM systems. However, the extent to which existing IM systems can establish whether in fact certain types of client user are online or not, is limited.

Another limitation with current IM systems is that some are not designed to interconnect with particular types of client applications or different IM systems. For example, other client applications may include email-based client applications (eg Eudora™, Microsoft Outlook™) and browser based client applications (eg Internet Explorer™ and Netscape™) on the internet, and also devices connected into a GSM network, such as mobile phones.

GSM networks have their own form of IM system for communicating short textual messages between different subscribers known as "Short Message Service" ("SMS"). With SMS, a "Short Message Service Centre" ("SMSC") provides a server through which all SMS messages that are sent and received by client subscribers are handled. The messages are short, typically limited to 160 characters in length, and are sent between subscribers of the GSM network, with the SMSC processing the messages for delivery to the right destination using the GSM mobile number of the intended receiver. Under the SMS protocol, the textual message from the sender is initially sent to the SMSC server using the cellular telephone network. The SMSC then stores the message and allocates it to the intended recipient for downloading, in accordance with normal GSM protocol, when the recipient is identified to be active within a cell.

SMS messaging is normally only provided between GSM clients that specifically subscribe to it, however, by virtue of the SMSC server, it is possible to connect to the internet using a particular protocol, dependent upon the particular GSM phone and network manufacturer. For example, Nokia™ use Computer Interface Message Distribution protocol version Two (CIMD2).

Even in those IM systems that permit connectivity with two or more different types of client application, either separate accounts are created for each different client type, or one client type is treated as the primary IM client and other client types are treated as terminal appliances to be merely notified of the sending of an IM to the corresponding primary IM client of the sender. The reason for this is that the IM systems that were initially developed, such as ICQ™, were strongly oriented so that most of the intelligence in providing the functionality of the IM system resided in the PC client application program. Consequently, other client types were considered to be quite disparate to the main client application and if two-way connectivity was provided, ie the ability to send a reply in response to a received message, this required a separate account or server for each different client type.

SUMMARY OF THE INVENTION

It is an object of the present invention to provide for instant messaging that operates on a single account for a plurality of different client types, irrespective of which client type initiates the message, and which provides two-way connectivity and substantially common functionality between all of the client types thereof.

In accordance with one aspect of the present invention, there is provided an instant messaging system comprising:
a plurality of clients having IM client applications of the same or different types;
an IM server selectively connected to each of said clients via a computer network and providing prescribed range of functionality to said clients;
each client type having a unique identifier to enable access thereto via said computer network; and
each client having a single account on said IM server for all of its client types that can access said IM server;
wherein said account is identified by a unique identification number common to all of the client types of that client; and wherein each said unique identifier of each client type of a said client is matched to said unique identification number of the particular client.

Preferably, said client types include clients connected to the computer network via:
(i) a PC-based instant messaging client application program;
(ii) a GSM device on a GSM network;
(iii) an internet browser-based client application; or
(iv) an email-based client application.

Preferably, said prescribed range of functionality includes:
(i) sending a textual message from one client to another;
(ii) receiving a textual message from one client to another; and
(iii) identifying which members of a group of clients that a client is a member or prospective member of are currently connected to the computer network, or are probably so connected.

Preferably, said computer network is the internet and/or any direct or electronic link.

Preferably, said client types connected to the computer network via the GSM network have SMS capability and are initially connected via an SMSC server to control and manage said SMS therebetween, and wherein said SMSC server is directly connected to said IM server via said computer network.

In accordance with another aspect of the present invention, there is provided a method for instant messaging between a plurality of clients having IM applications of the same or different types, selectively interconnected to an IM server by way of a computer network, whereby each client type has a unique identifier to enable access thereto via the computer network, the method comprising the following steps:
providing a single account on the IM server for each client in respect of all of its client types that can access the IM server;
identifying the account by a unique identification number that is common to all of the client types of that client; and matching each unique identifier of each client type of that client to said unique identification number thereof.

BRIEF DESCRIPTION OF THE DRAWINGS

The invention will be better understood in the light of the following description of one specific mode thereof. The description is made with reference to the accompanying drawings, wherein.

DETAILED DESCRIPTION OF THE INVENTION

The preferred embodiment of the mode of the invention is directed towards an instant messaging ("IM") system and a method of instant messaging, whereby the IM system comprises an IM server to which a number of users or clients may be selectively connected via the internet or direct electronic links using any or all of the following terminals or appliances: GSM mobile client, a PC-based client, an internet browser client, and an email client. This is essentially made possible by the IM system having basic enabling functions residing within the IM server and by using a single unique identification number ("UIN") for a user, regardless of the appliance or client type used by that user for accessing the IM server.

The basic functions of the IM system, i.e. the basic actions it can take on behalf of the user, consist of sending and receiving instant messages and detecting users who are "online", i.e., connected to the internet or otherwise accessible by instant messaging right at, or around, that particular moment in time. Users are also referred to as "buddies" in the IM system. There can be no absolute assurance that a user is actually online or reachable at a given moment by instant messaging due to the less than perfect stability of the internet and GSM networks, mobility of the GSM subscriber, and so on. However, the present mode envisages providing a reasonable assumption as to whether a user is likely to be reachable or not reachable at a given moment due to certain activities undertaken by the IM server that will be described in more detail later.

The IM server system is designed to undertake any of the aforementioned basic actions if triggered or instructed to do so by the particular appliance of the client accessing the IM server. This triggering occurs when the client appliance sends an electronic prompt or command to the IM server. A GSM device will do this by sending an SMS message to the IM server, an email client will do this by sending an email to the IM server, a browser client will do this by sending instructions or commands to the IM server via the Web, and a PC-based application will do this by sending commands to the IM server via an electronic or internet link. The format of the delivered information, such as the actual message or notification of who is online, necessarily depends on the appliance type. For example, with a GSM device the format will be in SMS format, with an email, it will be in email form, and with a browser client it will be in HyperText Markup Language ("HTML") form.

Now describing how the basic functions operate with respect to the various types of client, reference will be made initially to FIGS. 1 and 2 of the drawings.

Figure 1:
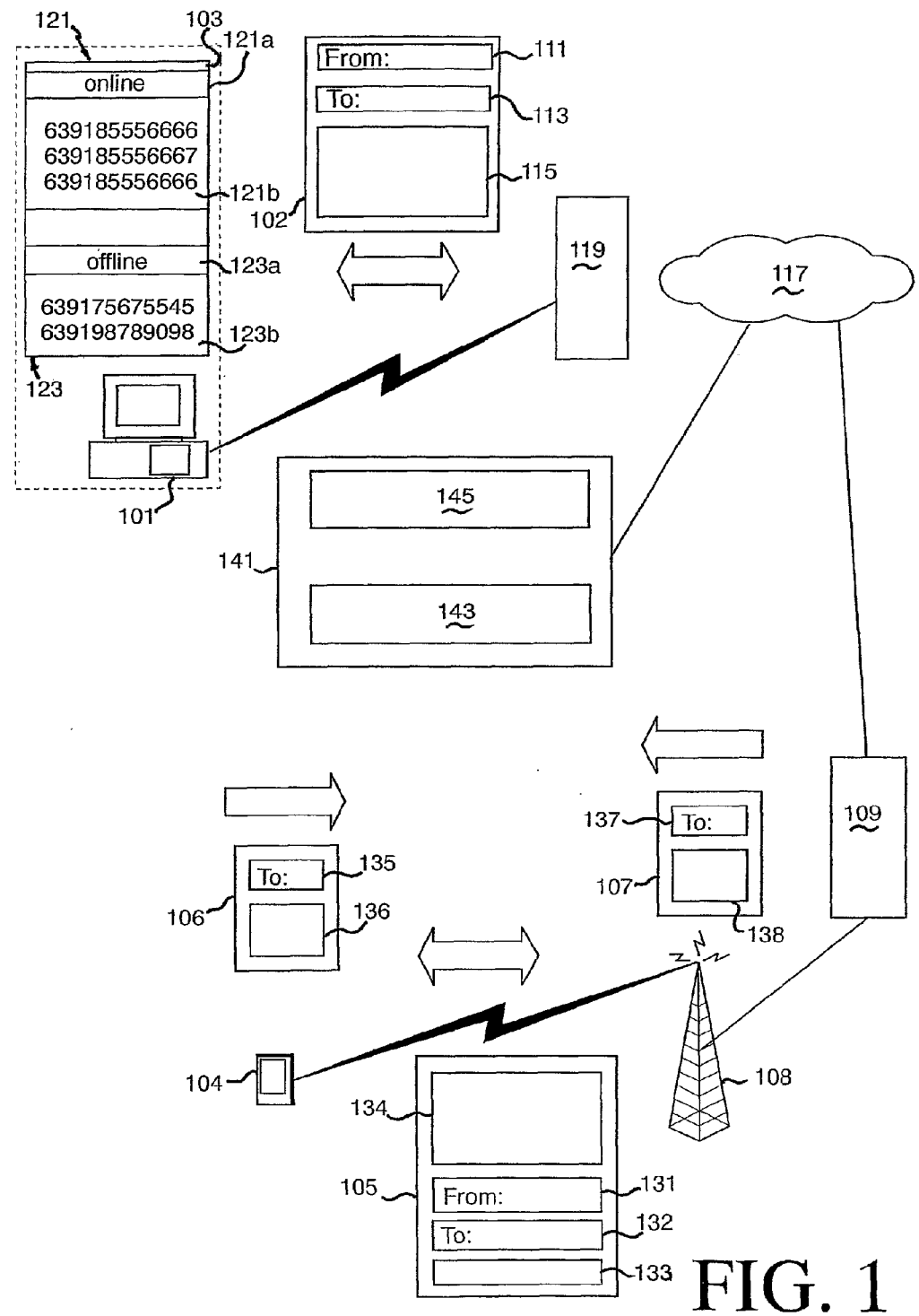
FIG. 1 is a schematic block diagram showing the embodiment of the IM system with PC-based and GSM device client applications connected to the IM server.

Dealing firstly with instant messaging using a PC-based client application, as shown in FIG. 1 of the drawings, an IM users internet-based PC application 101 resides as a program on the PC of the user. The program provides for the various functions of sending and receiving a message and notification of buddies that are online by two separate "pop up" panes, a sending and receiving message pane 102 and a buddy online pane 103.

The sending and receiving message pane 102 comprises a "From" header 111 for identifying the UIN of the client sourcing the message, a "To" header 113 for identifying the UIN of the client to whom the message is destined or targeted, and a message content space 115 for displaying the text of the instant message sent or received. In the actual PC application, the creation of this message may in fact be automated, with the senders UIN and recipient's UIN automatically included in the message when the computer icon of the recipient's name (the buddy) is double-clicked.

In order for messaging to occur, the IM system has a central host 141 comprising an IM server 143 where the enabling functions reside and a UIN database 145 of users amongst whom instant messages are sent and the enabling functions are stored and continuously updated. Accordingly, communication between various IM users' PC applications 101 and the IM system host 143 occurs via the internet 117 and the users' Internet Service Provider ("ISP") 119.

Sending messages from the PC-based client application firstly requires the user 101 to be connected online to the internet 117 via the user's ISP 119 and to select a "send message" option from a menu provided on the user client application specifying the available functions of the application. The user then needs to enter the message in the message content space 115 provided for in the sending and receiving message pane 102 and specify the target recipient by way of the target recipient's UIN or a proxy for it (such as his "buddy" name, for instance) in the "To" header 113. The program is designed to automatically display the user's UIN in the "From" header 111, by virtue of the user being deemed to be the sender as a consequence of the user selecting the "send message" option.

The program is designed to provide a visual notification to the user that a message has been received and can thus be read by the user selecting a "read message" option from the menu. On selecting the same, the sending and receiving message pane 102 will be displayed with the "From" header identifying the UIN of the sender of the message and the "To" identifying the UIN of the recipient, being the user.

The buddy online notification pane 103 comprises two halves, the top half 121 and a bottom half 123. The top half 121 has a header 121a labelled "online" and a space 121b in which all of the UIN's of buddies that are online, as previously defined, are listed. The bottom half 123 has a header 123a labelled "offline" and a space 123b in which all of the remaining UIN's of buddies of the user are listed that would be offline. The actual presentation of this information may vary slightly in the PC application, depending on the user's preference and the continually changing design of the application's Graphical User Interface ("GUI"). However, the basic information imparted remains the same.

The provision of such functions and the design of panes in a PC-based IM client application are well known in the art. Accordingly alternative modes of the invention may accomplish the same basic functions by different types of visual notifications, such as changing colours or pop out lists of icons identifying particular users or buddies.

With respect to providing these same functions in a GSM-based client, a necessarily different arrangement is provided where use is made of the existing SMS system used on GSM networks. In the GSM-based client, a GSM device 104 such as a mobile phone, is the terminal or appliance, and the user of this device operates it as a subscriber to the GSM network where telecommunications between subscribers are transmitted wirelessly through GSM cellular sites 108 disposed to create a cellular network.

A subscriber-to-subscriber SMS message on a GSM network includes an information packet 105 comprising the sender's numeric address (the GSM mobile phone number of the sender) 131, the target recipient's numeric address (typically the GSM mobile phone number of the receiver) 132, the GSM mobile number of the SMSC server which will process the message 133, and as much as a 160-character message 134.

The GSM network includes an SMSC server 109 that controls and manages the transmission of all SMS messages between subscribers. The SMSC server 109 includes a database of all SMS subscribers and stores SMS information packets 105 sent by subscribers for subsequent downloading by targeted recipients when the GSM device of a recipient is switched on and within a cell.

In the present embodiment, the IM system host 141 is directly connected to the SMSC server 109 via the internet 117. In alternative embodiments, however, the SMSC server may be connected via a direct electronic link. In this manner, messages or short messages can be sent via direct electronic or data lines through the internet from the IM server 143 to the SMSC server 109 for subsequent delivery to subscribers of SMS on the GSM network. Short messages are sent and received between the IM server 143 and the SMSC server 109 using the GSM network's message protocol. In the present mode, the particular protocol used is CIMD2. The system, however, can support other protocols such as Simple Message Paging Protocol ("SMPP"), Sending messages from the GSM mobile device 104 to a user of the IM system is accomplished by entering an SMS message 134 in the GSM device and specifying the target recipient's numeric address 132. The actual entry steps are specific to the GSM device manufacturer.

Importantly, the numeric address of the recipient is a combination of a numeric access code (as defined by the GSM carrier) and the target recipient's UIN. The access code is specific to the GSM carrier and is used to indicate to the SMSC server 109 that the SMS is to be forwarded to the IM server 143.

The GSM device 104 receives messages just as it would receive typical SMS messages from the GSM network's SMSC server 109. SMS messages received by a GSM client from the IM system host 141 are sent by an IM user whose "reply to" or "From" address 111 consists of an access code plus the UIN of the user.

The IM system is designed to provide buddy online notification to GSM clients by way of SMS messages containing online buddy information. The IM server 143 sends these messages to the GSM client 104 on triggering by a GSM client. The trigger for such a message may be automatic or manual, depending upon the specification of the user.

As shown in FIG. 1, manual triggers are accomplished by a user of a GMS device 104 sending an SMS message 106 containing a prescribed SMS command to the IM server 143.

The information packet for this SMS message 106 will contain the UIN 135 of the IM server and the prescribed "who is online command". The IM server 143 is designed so that when it receives this SMS message containing the "who is online command" from the SMSC server 109, it will send back an SMS message or a series of SMS messages 107 to the sender of the message notifying or listing the UIN's, and pseudonyms if entered, of those buddies of the sender who are online. Accordingly, the information packet for this SMS message 107 will contain the UIN 137 of the GSM client user and the list of buddies 138 who are online.

In the case of automatic triggering, the IM server is designed to send an SMS notification to the particular GSM client that a particular user or a group of users (buddies) are online or not, when the IM server detects their online presence or a change in such. Accordingly, with automatic triggering, there is no prompting required by the GSM user.

Figure 2:
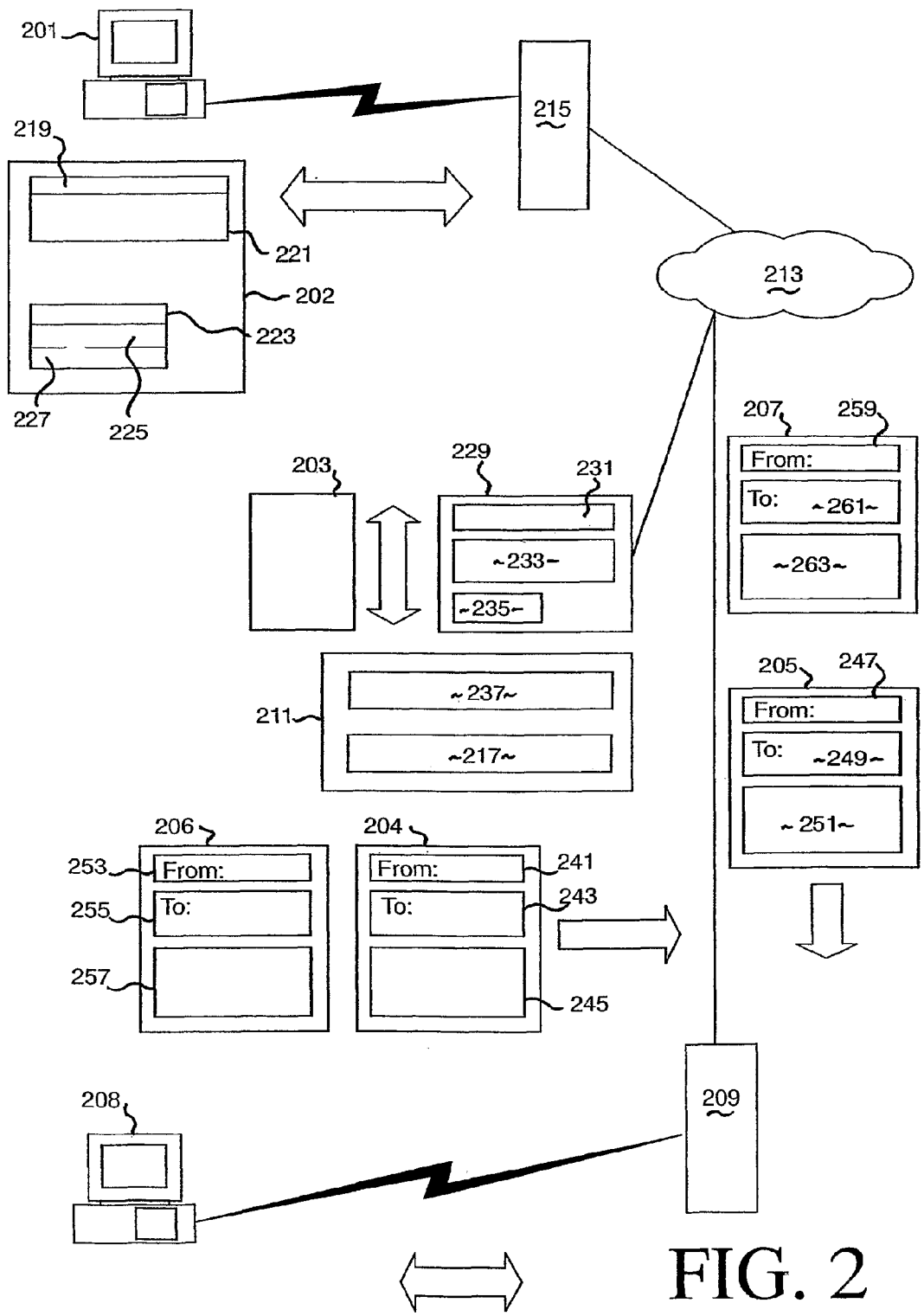
FIG. 2 is a schematic block diagram similar to FIG. 1, but showing the embodiment of the IM system with internet browser and email based client applications connected to the IM server.

Now having regard to an internet browser-based client application, as shown in FIG. 2 of the drawings, the application 201 resides with the internet browser (such as Netscape™ or Microsoft Internet Explorer™) on the PC of the user, and is activated by accessing a Web page 202 in the form of an HTML document in which information can be entered in relation to the various functions. The Web page 202 can be hosted by the central host 211 of the IM system and hence be accessed by the browser-based client 201 via the internet 213 and the user's ISP 215 or have direct connectivity to the IM server 217 of the central host 211 someway. Alternatively, the Web page can be hosted by another server (not shown) that both the browser-based client application 201 and the IM server 217 can have access to via the internet 213.

The format of the Web page 202 in the present embodiment is arranged so that a recipient header field 219 is provided in which the UIN of the intended receiver of the message may be entered, beneath which a message content space 221 is provided. The lower half of the page includes three buttons, a send button 223 for initiating sending of a message entered into the message content space 221, a receive button 225 for downloading a received message when notified of such, and a buddy online notification button 227 for retrieving a list of buddies that are connected online from the IM server 217 for viewing.

Sending messages from the internet browser is accomplished by entering a textual message in the message content space 221 provided for on the Web page, specifying the UIN of the target recipient in the recipient header field 219 and clicking the send button 223. The system is also designed to enable the user to alternatively, use a buddy name that is proxy for a UIN to target particular recipients of the message.

Messages received can be downloaded by clicking the receive button 225 on the Web page on receiving notification that a message has been sent to the particular user. This notification can be provided by various visual means as discussed in relation to the PC-based application. On clicking the receive button 225, an HTML message document 229 is downloaded from the IM server 217 to be viewed by the browser-based client. The HTML message document 229 comprises a "message from" header 231 containing the UIN of the sender or the proxy buddy name, a message content space 233 and a reply button 235 to facilitate the recipient sending a reply, if desired. This will trigger the creation of another Web page 202 with the recipient's UIN or buddy name entered automatically.

Buddy online notification is accomplished by clicking the buddy online notification button 227 on the Web page. This triggers the IM server 217 to send an HTML document 203 indicating which buddies of the particular user are currently online, as determined by the UIN database 237 associated with the central host 211.

It is to be noted, however, that with the creation of executable content within a Web page, it is possible to automate certain functions as described here, such as receiving messages and notification of buddies online, without having to push any of the buttons manually. Hence, messages can be said to be received in almost real time.

With respect to an email-based client application 208, again this resides with the email application program (such as Eudora™ or Microsoft Outlook™) on the PC of the user and is connected to the IM server 217 via the internet 213 and the ISP 209 of the user. The various functions such as send a message, receive a message and buddy notification are all catered for within the standard email format of the particular email application program.

The format for sending a message from the email-based application to a client via the IM server 217 is shown by the email message 204, where a "From" header address field 241 specifies the email address of the user sourcing the instant message, a "To" header address field 243 specifies the email address at the IM server 217 of the target recipient of the message and a message content space 245 is provided for entering the message.

The format for receiving a message from the IM server 217 to the email-based client is shown by the email message 205, where a "From" header address field 247 specifies the email address at the IM server of the sender of the message, a "To" header address field 249 specifies the email address of the targeted recipient of the message, and a message content space 251 is provided for the message contents.

Sending messages from an email client is accomplished by simply sending an email message 204 to an address that consists of the UIN with the Uniform Resource Locator ("URL") of the IM server 217 so that the email message can be accessed by the IM server via the internet 213.

With regard to delivering messages to the email-based client application 208, the IM server 217 converts instant messages it receives from other clients into standard email form 205 and then sends them to the user's email address. A UIN is matched to the user's email address. Hence within the IM system, messages sent to a recipient with that UIN will receive standard email through that user's email-based client application.

Buddy online notification is accomplished by email messages sent by the IM server 217 to the user's email address. The trigger for the email message may be automatic or manual, as specified by the user.

As shown in FIG. 2, manual triggers are accomplished by the email-based client creating an email message 206 formatted to include a "From" header address field 253 specifying the email address of the user sourcing the buddy notification request, a "To" header address field 255 specifying the email address at the IM server 217 for making such buddy notification requests, and a message content space 257 in which a requisite command asking for a list of online buddies is entered. The message with the command may be embodied in the "subject" portion or the "body" portion of the email message.

The buddy online notification message sent from the IM server 217 is similarly an email message 207 including a "From" header address field 259 specifying the email address at the IM server for handling such buddy notification requests, a "To" header address field 261 specifying the email address of the user making the request, and a message content space 263 listing the buddies of the user who are online as obtained from the UIN database 237 of the central host 211.

It is important to appreciate that the arrangement of the central host 141 and 211 is such that the user can send or receive messages or buddy online notifications through any combination of the client appliances described above, as specified by the user.

As mentioned above, the single account system is made possible:
(i) by concentrating the basic functions of the IM system on the server system; and
(ii) by the way the system matches or assigns UINs to users who may be accessing the IM server system via different client appliances.

As for the latter, two design considerations are crucial to the IM system architecture: the use of a single UIN to identify a user regardless of access appliance; and the matching of that one and only UIN to each appliance type.

As described, the IM system of the present embodiment permits the user to access their account with any of the following appliances; PC based client application, GSM client, internet-browser client, and email client. Regardless of access type, the IM server can recognize the user, matching them to their particular UIN accordingly. From there on, the user has access to the basic functions of the IM system. Moreover, the user is able to send and receive instant messages and receive buddy online notifications.

The manner in which this matching of UIN's to appliances and users by the IM server will now be described for each user appliance with reference to FIGS. 3 and 4.

Figure 3:
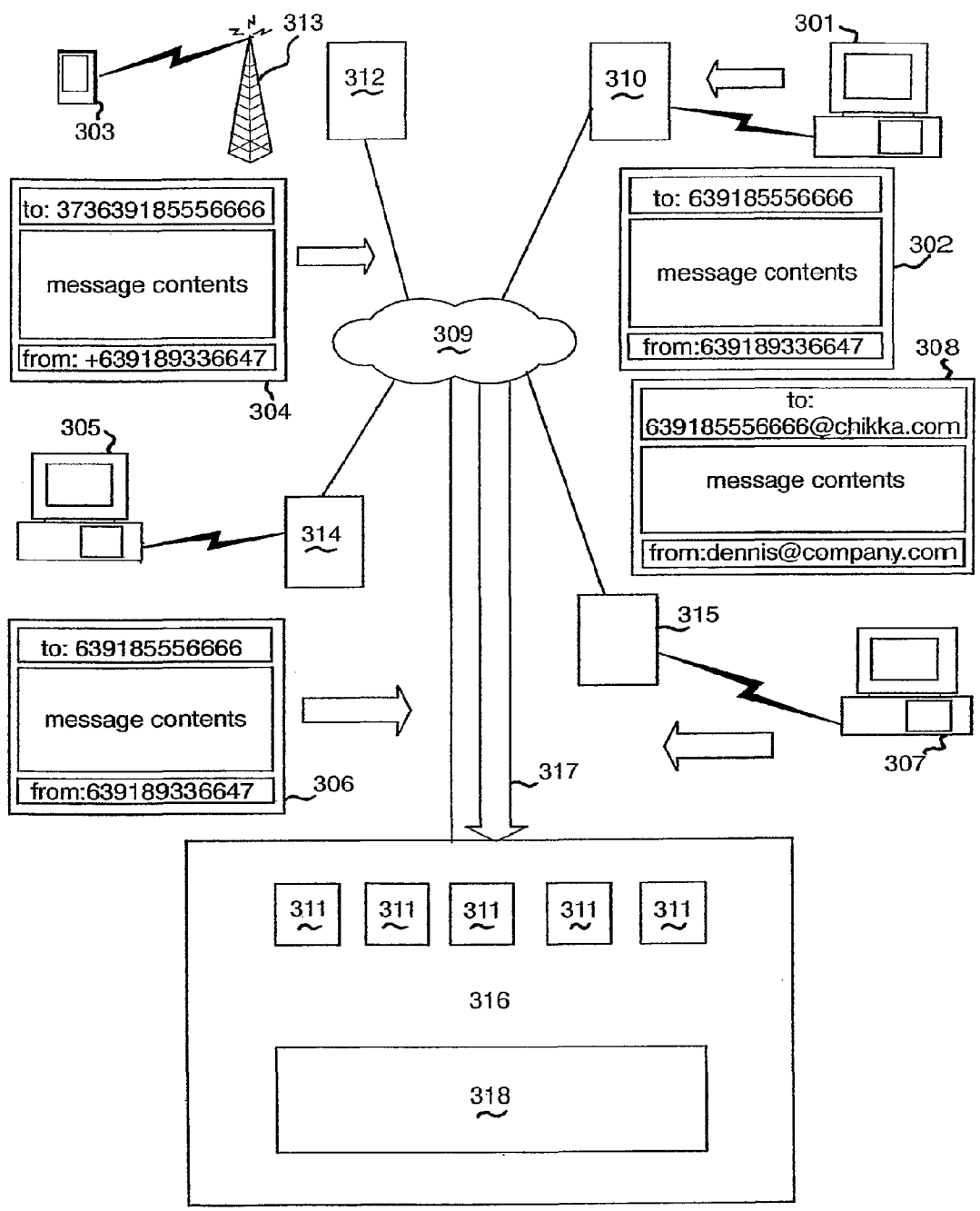
FIG. 3 is a schematic block diagram showing the four different ways of transmitting a message to the IM server according to the particular client type.

Firstly, with respect to a PC-based client application 301, as shown in FIG. 3, when the user runs their PC application via the internet 309 and their ISP 310, either of two events takes place: the IM server 311 to which the user connects (in practice multiple servers are run at the IM system host 316) automatically recognizes the user; or the IM server 311 to which the user connects prompts the user to enter their UIN and password manually.

The former case is adopted for "single user" versions of the PC-based client in the present embodiment, whereby the IM server 311 to which the user is connected recognizes the user through the receipt of the user's UIN that has been stored in memory by the PC application.

The latter case is adopted for "multiple user" versions of the PC-based client, whereby the user must enter their UIN and password as instructed, in order to be recognized by the IM server 311 to which it is connected.

Figure 4:
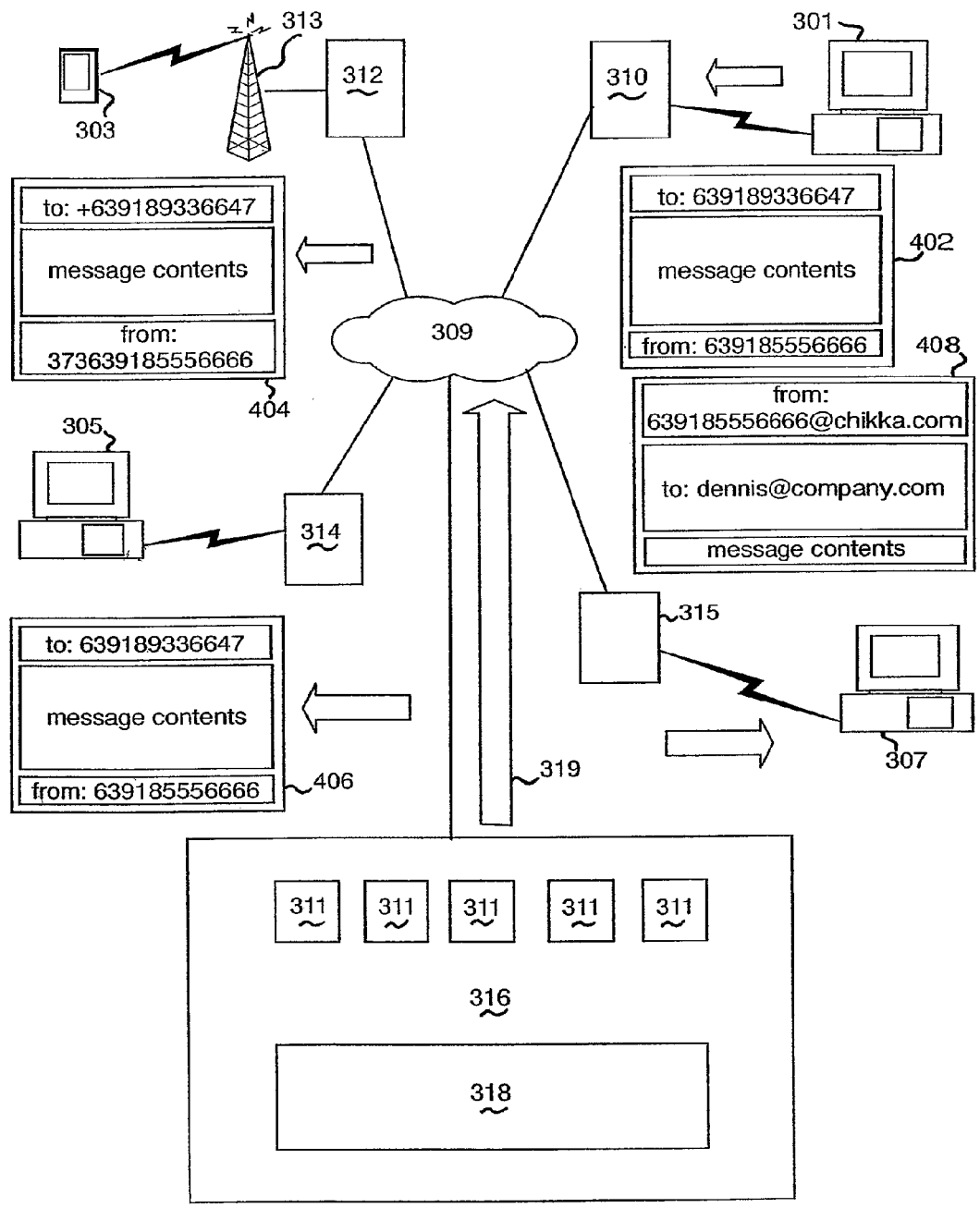
FIG. 4 is a similar diagram to FIG. 3, but showing the four different ways that a message may be received from the IM server, according to the particular client type.

In either case, as shown in FIG. 4, the user is notified of any existing or new messages received by the IM server 311 for the user. These messages 402 can be downloaded or read by the user directly from the client application 301. The user can also send messages 302 directly through client application 301. Finally, buddies online are notified visually through icons and detailed lists.

With respect to a GSM client application provided by a GSM device 303, the IM server 311 to which the SMSC server 312 is connected via a GSM cellular site 313 and the direct electronic link or the internet 309, matches the user's (unique) GSM mobile phone number to their UIN. The IM system of the present embodiment in fact uses the (country code)+(area code or GSM carrier code)+(mobile phone number) to form the user's UIN when the user first registers using his GSM device. Hence, matching is straightforward since all SMS messages include the GSM mobile number of the sender.

Messages received by the IM server 311 for the GSM client are sent directly to the SMSC server 312 of the GSM network. The GSM client user eventually receives these messages 404 when the GSM network detects the availability of their GSM device 303 to receive messages. The GSM client user can send messages 304 to IM users by SMS, with the address formed by appending an access code (as defined by the GSM carrier) to the recipients' UIN. Notifications of buddies online are accomplished through SMS messages sent to the user's GSM device.

In the case of an internet-browser client 305, the IM server 311 to which the client is connected via the internet 309 and the ISP 314 of the user recognizes the browser client user when the user logs in and the user's "cookie" is tracked all throughout the session. The IM server 311 checks on the "cookie" of any user each time a user prompts the IM server. This is how the user is tracked throughout a session. A "cookie" is a data file residing on the PC running the web browser that contains information based on the prior activities of the user, which also allows the IM server to identify the user. For that session, a cookie, which identifies the browser client user, is associated with that user's UIN. Upon logging on, the user is notified of any messages that have been received by the IM server 311 to which it is connected. These messages 406 are downloaded in HTML format.

The user can send a message by entering the message on the Web page 306 and then prompting the IM server 311 to which it is connected to capture the message. Notifications of buddies online are accomplished by prompting the IM server 311 to send this information via the internet 309 in HTML format. Again, with the creation of executable content within a Web page, it is possible to receive messages and be notified of buddies online automatically, without prompting the IM server manually.

With an email client application 307 the IM server 311 to which it is connected via the internet 309 and the ISP 315 of the user recognizes the email client user through its email address. A UIN is always matched to this email address. The IM server 311 to which the client is connected automatically sends instant messages 408 for this user to its matching email address as the server receives them.

The user can send a message to an IM user by simply sending an email message 308 to an address that consists of the recipient's UIN attached to the URL associated with, or which can be accessed by, the IM server 311 via the internet. An instant message sent by this user is identified as originating from a user with this UIN, not necessarily that user's email.

In the specific example shown in FIGS. 3 and 4, each of the client applications 301, 303, 305 and 307 belong to the one user, which has the UIN '639189336647' common to all of its applications. An instant message is intended to be sent to the user having UIN '639185556666'. The various client applications address the targeted recipient of the message in the manner appropriate to their particular client type. The PC-based and browser-based client applications simply address the message direct to the UIN of the targeted recipient. The GSM client, however, needs to append the access code allocated to the IM server by the SMSC server 312, in this example '373', to the start of the UIN of the targeted recipient for dialling out through the GSM network. The email-based client addresses the message to the UIN address of the URL of the IM server 311, in this case '639185556666@chikka.com'.

The message is then sent from the client applications out through the internet 309 to reach the IM server 311 at the IM system host 316 as indicated by the arrow 317.

On receipt, the message is processed by the system 316 by accessing the UIN user information database 318. Accordingly, the user status of the targeted recipient is determined and the client devices that may be accessed for that user based on the user settings stored in the UIN database 318 are established to ensure proper routing of the message to the selected client devices of the recipient.

In the example shown in FIG. 4, the targeted recipient of the message being handled by the IM server 311 is the user with UIN '639189336647' and the sender is the user with UIN '639185556666'. The IM server 311 selected for transferring the message to the selected client devices (in this example all of the client applications 301, 303, 305 and 307) sends the message as indicated by arrow 319 via the internet 309 to the various client applications using the UIN in the appropriate format of the particular client type to address the user. In the case of the PC-based and browser-based client applications, this will simply be the UIN itself. In the case of the GSM application, it will actually be the telephone number of the target recipient, which is the UIN in any event in this example. In the case of the email-based client, it will simply be the email address of the targeted recipient. In this example, the IM server 311 sees that the UIN '639189336647' of the target recipient for its email-based application corresponds to 'dennis@company.com'.

It should be noted in all instances that the user's UIN is the user's primary identifier for the purpose of handling instant messages addressed to them or originating from them. The one-to-one matching of this UIN to the unique identifiers for each appliance creates the basic foundation for the single account system of the IM system.

A key reason for using a numeric such as the UIN is speed. This is particularly useful in accomplishing the fast transmission of instant messages with GSM devices. In order to respond to an IM message received by a GSM device user, all the sender is required to do is to click the reply button, whereupon the UIN of the sender is automatically entered into the GSM device's "reply to" address.

Moreover, originating messages by the GSM device user is likewise easy and fast. All the user has to do is to enter in the "send to" address the intended recipient's UIN appended to the GSM carrier's access code. This combination access code-UIN can in fact be stored in the address books of most GSM devices, thereby facilitating fast recall of addresses and transmission of messages.

It should be appreciated that the scope of the present invention is not limited to the specific mode and the embodiment thereof described herein. Accordingly, changes and improvements to the embodiment that amount to no more than common general knowledge are not considered to depart from the spirit or scope of the invention.

We claim:

1. An instant messaging (IM) system interfaced with a mobile phone network, said IM system comprising:
 a plurality of clients, each client having a different account from every other client, each client having IM client applications of one or more client types, said client types including mobile phone client types having a mobile phone with a unique mobile phone telephone number, and including a plurality of computer network interfaced client types;
 an IM server selectively connected to said client types and providing a prescribed range of functionality to said clients;
 each client type of said computer network interfaced clients having a unique identifier to enable access thereto via said computer network; and
 each client account being a single account on said IM server for all of its client types that can access said IM server; wherein each of said account is identified by a unique identification number being based on the unique mobile phone telephone number, and wherein said IM server records each said unique identifier of each and every client type of said client matched with said unique identification number of said client, such that the unique identification number is common to all of the client types of said client;
wherein said client with a mobile phone is able, through said IM server, to send to or receive from any client type of another client a message, and the another client is identified in said client's mobile phone in relation to the message by the unique identification number.

2. An instant messaging system as claimed in claim 1, wherein said computer network interfaced client types include clients connected to the IM server via a computer network using: (i) a PC-based instant messaging client application program; (ii) an internet browser-based client application; or (iii) an email-based client application.

3. An instant messaging system as claimed in claim 1, wherein said prescribed range of functionality includes: (i) sending a message from one client to another; (ii) receiving a message sent by one client to another; and (iii) identifying which members of a group of clients that a client is a member or prospective member of are currently connected to the computer network, or are probably so connected.

4. An instant messaging system as claimed in claim 1, wherein said computer network includes the internet.

5. An instant messaging system as claimed in claim 1, wherein said client types being mobile phone clients have SMS capability and are initially connected via an SMSC server to control and manage said SMS therebetween, and wherein said SMSC server is directly connected to said IM server.

6. A method for instant messaging between a plurality of clients each having instant messaging (IM) applications of one or more different client types, said client types including mobile phone client types having a mobile phone with a unique mobile phone telephone number, and including a plurality of computer network interfaced client types; said client types being selectively interconnected to an IM server by way of a computer network, whereby each computer network interfaced client type has a unique identifier to enable access thereto via the computer network, the method comprising the following steps:
 providing a single account on the IM server for each client in respect of all of its client types that can access the IM server, each single account being different for every client;
 identifying the account by a unique identification number that is based on the unique mobile phone telephone number, and
 recording in said IM server each unique identifier of each client type of that client matched with said unique identification number thereof, such that the unique identification number is common to all of the client types of that client;
wherein said client with a mobile phone is able, through said IM server, to send to or receive from any client type of another client a message, and the another client is identified in said client's mobile phone in relation to the message by the unique identification number.

7. An instant messaging system as claimed in claim 3, wherein said prescribed range of functionality further includes replying to the sender client of a received message by reference to the sender client's unique identification number.

8. A computer readable medium containing executable software for operating an instant messaging system as claimed in claim 1.

9. An instant messaging system as claimed in claim 1 wherein said IM server is adapted to assign said unique identification number to a user of said computer network interfaced client.

* * * * *